United States Patent [19]

Harris

[11] 4,343,593

[45] Aug. 10, 1982

[54] COMPOSITE BLADE FOR TURBOFAN ENGINE FAN

[75] Inventor: David J. Harris, Fairfield, Ohio

[73] Assignee: The United States of America as represented by the Secretary of the Air Force, Washington, D.C.

[21] Appl. No.: 115,516

[22] Filed: Jan. 25, 1980

[51] Int. Cl.$^3$ .................................................. F01D 5/30

[52] U.S. Cl. ........................... 416/193 A; 416/229 A; 416/241 A; 416/230

[58] Field of Search .......... 416/193 A, 230 R, 229 A, 416/241 A

[56] References Cited

U.S. PATENT DOCUMENTS

| | | | |
|---|---|---|---|
| 3,749,518 | 7/1973 | Alver | 416/230 R |
| 3,752,600 | 8/1973 | Walsh | 416/230 R |
| 4,019,832 | 4/1977 | Salemme | 416/193 A |
| 4,045,149 | 8/1977 | Ravenhall | 46/193 A |
| 4,047,840 | 9/1977 | Ravenhall | 416/248 |

*Primary Examiner*—Douglas Hart

*Attorney, Agent, or Firm*—Donald J. Singer; Arsen Tashjian

[57] ABSTRACT

A turbofan engine fan blade made of composite material, and a method of making the fan, are taught. The fan blade essentially comprises an airfoil section having a root end and made of a plurality of bonded plies of composite material which are splayed and which are in a staggered condition at the root end; a two-piece platform section made of titanium or of aluminum, with one piece of the platform on each side of the airfoil section; and a steel outsert section which holds and secures the platform section to the airfoil section, with the outsert section having a triangular shaped cavity located at the root end of the airfoil section, between the splayed and staggered plies of the airfoil section. Among other advantages, the cavity eliminates the "insert plies" (or wedge) used in the prior art and the inherent disadvantages associated with such use.

7 Claims, 3 Drawing Figures

10
20
25A
25B
25C
25D
25E
25F
24
23
32
31
30
30
32
31
42
40
43
43
INWARDLY
40
42
22
41
22
41B
41A

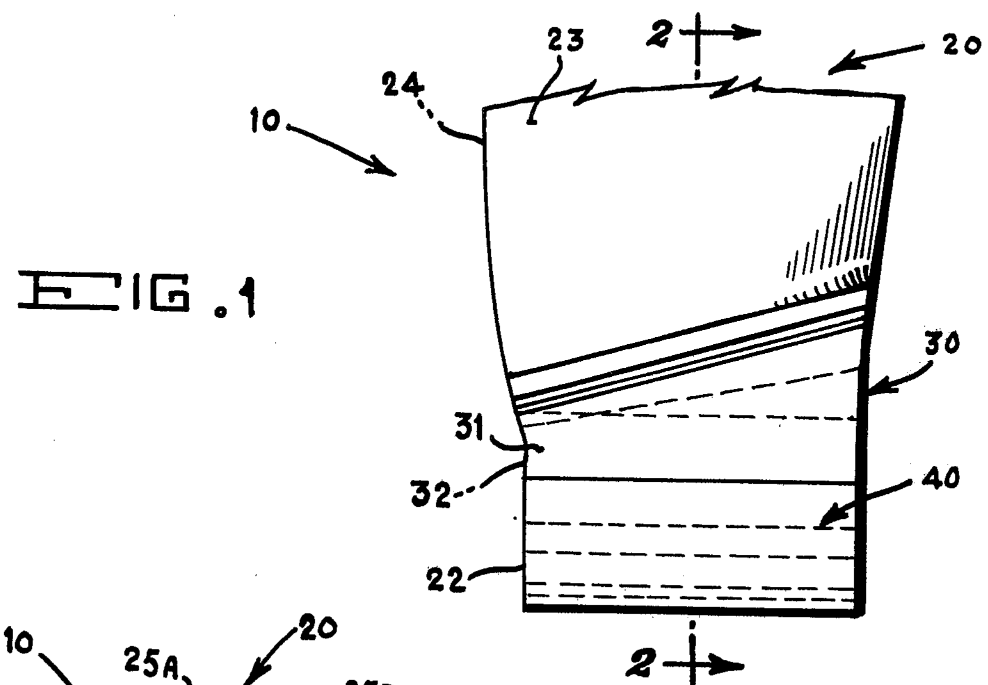
FIG. 1
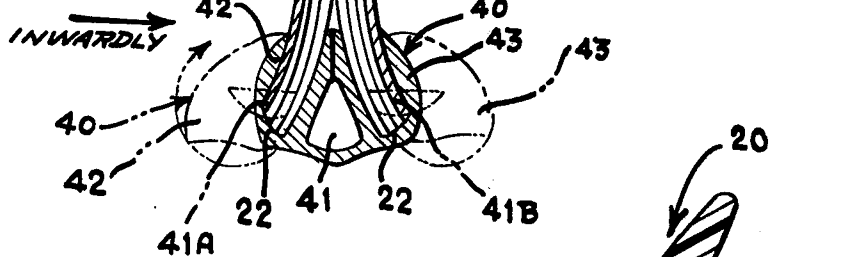
FIG. 2
20
10
24
21
23
FIG. 3

COMPOSITE BLADE FOR TURBOFAN ENGINE FAN

STATEMENT OF GOVERNMENT INTEREST

The invention described herein may be manufactured and used by or for the Government for governmental purposes without the payment of any royalty thereon.

BACKGROUND OF THE INVENTION

This invention relates to the jet engine art and, more particularly, to a unique turbofan engine fan blade that is made in part of composite material, and to a novel method of forming (i.e., making) it.

It is well known in the art that for many years attempts have been made to manufacture and use a turbofan engine fan blade that is made of composite material. It is fair and accurate to say that these prior art attempts have been fruitless, either in the manufacture stage or in the use stage. One of the basic causes of these prior art failures has been the need to use "insert plies", or the equivalent (such as a wedge-shaped solid) between the splayed plies in the root portion of the blade.

I have invented a unique turbofan engine fan blade, and a method of making it, that overcomes that disadvantage and, additionally, results in other substantial advantages which will be set forth later herein. Thereby, I have significantly advanced the state-of-the-art.

SUMMARY OF THE INVENTION

My invention comprises a turbofan engine fan blade, and a method of forming (i.e., making) it, to avoid the use of an insert ply or the like (such as a wedge) and the inherent disadvantages associated with the use of such an insert.

Accordingly, the principal object of this invention is to teach the structure of a preferred embodiment of my unique fan blade and the steps of my novel method of making it.

This principal object, as well as related objects (such as use of existing manufacturing technology, reduction in weight of the fan blade assembly, and substantial reduction of plies used in the blade), of my invention will become readily apparent after a consideration of the description of the invention, together with reference to the Figures of the drawings.

DESCRIPTION OF THE DRAWINGS

FIG. 1 is a side elevation view, in simplified pictorial and schematic form and partially fragmented, of a preferred embodiment of my turbofan engine blade;

FIG. 2 is a cross sectional view, taken along line 2—2 in FIG. 1, of my fan blade, with the view being in simplified pictorial and schematic form and partially fragmented; and FIG. 3 is a top plan view, in simplified pictorial and schematic form and partially in cross section, of my fan blade connected to an associated turbofan engine fan element.

It is to be noted that the Figures of the drawings also show the result of practicing the steps of my inventive method, as will be described later herein.

DESCRIPTION OF THE PREFERRED EMBODIMENT

With reference to FIGS. 1–3, inclusive, therein is shown the preferred embodiment 10 of my invention turbofan engine fan blade.

In the most basic and generic structural form, the turbofan engine fan blade 10 comprises: an airfoil section 20 (i.e., an air-moving part which may be any suitable form, but which is typically (as shown here) cambered and with a twist); a complementarily structured two-piece platform section 30 that is disposed at the root end 22 of the airfoil section 20; and an outsert section 40 that holds and secures the platform section 30 to the airfoil section 20.

More specifically, the airfoil section 20 has a tip end 21, a root end 22 as mentioned above, and a first surface 23 and a second surface 24 therebetween (i.e., between the tip end 21 and the root end 22), with the first surface 23 being essentially convex (because of the above-mentioned "twist") and the second surface 24 being essentially concave (also because of the above-mentioned "twist"), and with the airfoil section 20 comprising a plurality of bonded plies of composite material (such as representative plies 25A–25F, FIG. 2) which are splayed in a staggered condition at the root end 22. It is here to be noted that suitable composite material is known to those of ordinary skill in the art, and that my invention is not concerned with the chemistry of the airfoil section except to the extent that as a matter of preference, and not of limitation, I prefer a composite material which includes reinforcing filaments (such as those made of graphite) that are embedded in a matrix material (such as an epoxy resin).

Additionally, the platform section 30 of my fan blade 10 includes: a first member 31 that is complementary to, and is disposed in abutting contact with, the convex first surface 23 of the airfoil section 20 at the root end 22 of the airfoil section 20; and, a second member 32 that is complementary to, and is disposed in abutting contact with, the concave second surface 24 of the airfoil section 20 at the root end 22 of the airfoil section 20. These first and second members 31 and 32 are preferably made of metal, and also preferably of either titanium or aluminum.

Further, the outsert section 40 of my fan blade 10 is made of metal and has a cavity 41 therein that is located at the root end 22 of the airfoil section 20, with this cavity 41 also simultaneously positioned between the splayed and staggered plies (such as between representative plies 25A–25C, inclusive, and representative plies 25D–25F, inclusive) of the airfoil section 20. As a matter of preference, the metal outsert section 40 is made of steel, and the cavity 41 therein has a cross sectioned shape that is essentially in the form of an upright triangle, as is shown in FIG. 2.

DESCRIPTION OF THIS INVENTIVE METHOD

As a preliminary matter, reference is made to FIGS. 1–3, inclusive, which show the result of practicing the steps of my inventive method.

My method of forming (i.e., making) a turbofan engine fan blade, such as 10, comprises essentially seven steps, as follows:

Firstly, forming an airfoil section 20 having a tip end 21, a root end 22, and a first 23 and a second 24 surface therebetween (i.e., between the tip end 21 and the root end 22), with the first surface 23 being essentially convex and the second surface 24 being essentially concave, and with the airfoil section comprising a plurality of bonded plies of composite material (such as representative plies 25A–25F, inclusive, FIG. 2) which are splayed in a staggered condition at the root end 22).

Next, forming a platform section 30 having a convex first member 31 that is complementary to the convex first surface 23 of the airfoil section 20, and also having a concave second member 32 that is complementary to the concave second surface 24 of the airfoil section 20. Preferably, the platform section members 31 and 32 are formed of metal selected from the group consisting of aluminum and titanium.

Then, forming a metal outsert section 40 in a flat one-piece condition (as is shown in phantom in FIG. 2) having a first portion 42 with a groove 41A therein and an abutting second portion 43 with a groove 41B therein which is symmetrical to, and is in parallel spaced relationship with, the groove 41A in the first portion 42, and with the metal outsert section 40 being inwardly bendable between the first 42 and the second 43 portions such that, when the metal outsert section 40 is so bent (i.e., inwardly, between the first 42 and the second 43 portions), the groove 41A and 41B meet to form a cavity, such as cavity 41, FIG. 2.

Next, placing the convex first member 31 of the platform section 30 on, and in abutting contact with, the second portion 43 of the metal outset section 40.

Then, placing the airfoil section 20 on the convex first member 31 of the platform section 30, with the root end 22, and the first essentially convex surface 23, of the airfoil section in abutting contact with the convex first member 31 of the platform section 30.

Next, placing the concave second member 32 of the platform section 30 on, and in abutting contact with, the root end 22, and the second essentially concave surface 24, of the airfoil section 20.

Lastly, bending the first portion 42 of the metal outsert section 40 inwardly, toward the concave second member 32 of the platform section 30, until the convex first member 31 of the platform section 30, and the airfoil section 20, and the concave second member 32 of the platform section 30 are held and are secured between the first 42 and the second 43 portions of the metal outsert section 40, and also until the groove 41A in the first portion 42 of the metal outsert section 40 and the symmetrical groove 41B in the second portion 43 of the metal outsert section 40 meet and form a cavity (i.e., cavity 41, FIG. 2).

Thereby, my turbofan engine fan blade is formed.

It is to be noted that, as a matter of preference, the groove 41A in the first portion 42 of the metal outsert section 40, and the symmetrical groove 41B in the second portion 43 of the metal outsert section 40, are each formed in a shape such that when these symmetrical grooves 41A and 41B meet, as a result of the inwardly bending of the first portion 42 of the metal outsert section 40, and the cavity 41 is formed, then that cavity 41 is essentially in the shape of an upright triangle, as is shown in FIG. 2.

MANNER OF USE OF MY PREFERRED EMBODIMENT

The manner of use of the preferred embodiment 10, FIGS. 1–3, inclusive, of my unique turbofan engine fan blade can be easily ascertained by any person of ordinary skill in the art from the foregoing description of my preferred embodiment 10, and from the foregoing description of the constituent steps of my inventive method, coupled with reference to the contents of the Figures of the drawings.

CONCLUSION

It is abundantly clear from all of the foregoing, and from the Figures of the drawings, that the principal object, as well as the related objects, of my invention have been achieved.

It is to be noted that, although there have been described and shown the fundamental and unique features of my invention as applied to a preferred embodiment, various other embodiments, variations, adaptations, substitutions, additions, omissions, and the like, may occur to, and can be made by, those of ordinary skill in the art, without departing from the spirit of my invention.

Additionally, because of my teaching, it may occur to others of ordinary skill in the art that, in appropriate particular circumstances, the basic and fundamental steps of my inventive method may be increased or decreased in number, or may be changed in sequence or otherwise varied. In this regard, it is to be noted that the same desired results will be obtained, nevertheless.

What is claimed is:

1. A turbofan engine fan blade, comprising:

a. an airfoil section having a tip end, a root end, and a first and a second surface therebetween, wherein said first surface is essentially convex and said second surface is essentially concave, and wherein said airfoil section comprises a plurality of bonded plies of composite material which are splayed and are in a staggered condition at said root end;

b. a platform section which includes:
   (1) a first member complementary to, and disposed in abutting contact with, said convex first surface of said airfoil section at said root end thereof; and
   (2) a second member complementary to, and disposed in abutting contact with, said concave second surface of said airfoil section at said root end thereof; and c. a metal outsert section holding and securing said platform section of said airfoil section at said root end thereof, and means within said outsert section for defining a cavity therein, with said cavity located at said root end of said airfoil section and simultaneously also positioned between said splayed and staggered plies of said plurality of plies of said airfoil section.

2. A turbofan engine fan blade, as set forth in claim 1, wherein said plurality of plies of said airfoil section are made of composite material which includes reinforcing filaments embedded in a matrix material.

3. A turbofan engine fan blade, as set forth in claim 2, wherein said reinforcing filaments are made of graphite, and wherein said matrix material is an epoxy resin.

4. A turbofan engine fan blade, as set forth in claim 3, wherein said platform section is made of metal.

5. A turbofan engine fan blade, as set forth in claim 4, wherein said metal of which said platform section is made is selected from the group consisting of aluminum and titanium.

6. A turbofan engine fan blade, as set forth in claim 5, wherein said cavity in said outsert section has a cross sectioned shape that is essentially in the form of an upright triangle.

7. A turbofan engine fan blade, as set forth in claim 6, wherein said metal outsert section is made of steel.

* * * * *